United States Patent
Komaba et al.

(10) Patent No.: US 6,502,307 B2
(45) Date of Patent: Jan. 7, 2003

(54) DOUBLE ROW TAPER-ROLLER BEARING AND METHOD OF ASSEMBLING THE SAME BEARING

(75) Inventors: Michio Komaba, Saitama-ken (JP); Katsumi Kobayashi, Saitama-ken (JP); Eishi Shibuya, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/843,953

(22) Filed: Apr. 30, 2001

(65) Prior Publication Data

US 2001/0016092 A1 Aug. 23, 2001

Related U.S. Application Data

(62) Division of application No. 09/376,488, filed on Aug. 18, 1999, now Pat. No. 6,287,015.

(30) Foreign Application Priority Data

Aug. 18, 1998 (JP) ............................. 10-246526
Aug. 24, 1998 (JP) ............................. 10-237398

(51) Int. Cl.⁷ ............................................ B21K 1/40
(52) U.S. Cl. ........................... 29/894.361; 29/898.062; 29/898.07; 29/898.09; 29/407.05; 29/423; 33/517; 33/545; 33/DIG. 17
(58) Field of Search .................... 29/898.061, 898.062, 29/898.07, 898.09; 33/517, 657, 545, 546, 547, DIG. 17; 384/571, 572, 576, 580, 449, 559, 560, 589, 584–586, 564, 569, 504, 505, 506, 512; 301/105.1

(56) References Cited

U.S. PATENT DOCUMENTS

| | | | | |
|---|---|---|---|---|
| 1,761,490 A | * | 6/1930 | Penner | 384/585 |
| 1,916,233 A | * | 7/1933 | Riblet | 384/585 |
| 2,003,339 A | * | 6/1935 | Buckwalter | 384/459 |
| 2,071,945 A | * | 2/1937 | Oelkers et al. | 384/459 |
| 2,118,756 A | * | 5/1938 | Bergert | |
| 2,606,799 A | * | 8/1952 | Weckstein | 384/571 |
| 2,627,120 A | * | 2/1953 | Hotchkiss | |
| 2,796,658 A | * | 6/1957 | Aller | |
| 3,589,747 A | * | 6/1971 | Asberg | |
| 3,720,450 A | * | 3/1973 | Dominik | 384/572 |
| 3,733,111 A | * | 5/1973 | Harlan et al. | 384/576 |
| 4,333,695 A | * | 6/1982 | Evans | 384/571 X |
| 4,336,641 A | * | 6/1982 | Bhatia | |
| 4,723,851 A | * | 2/1988 | Troster | |
| 4,728,204 A | * | 3/1988 | Colanzi et al. | 384/572 |
| 4,883,371 A | * | 11/1989 | Matsumoto | |
| 5,037,214 A | * | 8/1991 | Dougherty | |
| 5,206,993 A | * | 5/1993 | Brough | |
| 5,226,737 A | * | 7/1993 | Sandy, Jr. | |
| 5,443,316 A | * | 8/1995 | Deane et al. | 384/485 |
| 5,494,358 A | * | 2/1996 | Dougherty | |
| 5,620,263 A | * | 4/1997 | Ohtsuki et al. | |
| 5,706,580 A | * | 1/1998 | Ohtsuki et al. | |
| 5,974,665 A | * | 11/1999 | Frielingsdorf et al. | |
| 6,058,767 A | * | 5/2000 | Calvin | |
| 6,135,643 A | * | 10/2000 | Hattori et al. | |
| 6,280,093 B1 | * | 8/2001 | Ohtsuki et al. | |

FOREIGN PATENT DOCUMENTS

| | | |
|---|---|---|
| DE | 198 33 436 | 2/1999 |
| EP | 0 561 377 | 9/1993 |
| JP | 11-44322 | 2/1999 |

* cited by examiner

*Primary Examiner*—Gregory M. Vidovich
*Assistant Examiner*—Eric Compton
(74) *Attorney, Agent, or Firm*—Crowell & Moring LLP

(57) ABSTRACT

The present invention provides a double row taper-roller bearing and a method of assembling a double row taper-roller bearing, which are, when in an assembly, capable of assembling and being assembled by controlling a negative axial gap after the assembly. The present invention-provides also a wheel support structure and a method of the assembling the same structure.

2 Claims, 16 Drawing Sheets

US 6,502,307 B2

DOUBLE ROW TAPER-ROLLER BEARING AND METHOD OF ASSEMBLING THE SAME BEARING

This application is a division of application Ser. No. 09/376,488, filed Aug. 18, 1999 now U.S. Pat. No. 6,287, 015.

BACKGROUND OF THE INVENTION

1. Field of the Invention

The present invention relates generally to a double row taper-roller bearing and an assembling method thereof, and more particularly to a method of assembling a double row taper-roller bearing by controlling a negative axial gap. The present invention also relates to a wheel support structure and a method of assembling the same structure.

2. Related Background Art

In a conventional double row taper-roller bearing, the control of a negative axial (axial direction) gap has hitherto involved such a construction that two pieces of inner rings are disposed side by side on a cylindrical member facing to one single outer ring having two tapered track surfaces, and a spacer is interposed between two inner rings. More specifically, so to speak, two sets of completed taper-roller bearings are disposed side by side in the axial direction, the spacer is interposed therebetween, a pre-load is controlled by fastening the two bearings from the axial direction, and the double row taper-roller bearing is assembled.

The double row taper-roller bearing, however, tends to be a part of an apparatus using this type of bearing rather than a single unit of bearing, wherein an inner ring and an outer ring of the bearing are being made integral with the members which have supported so far the inner ring and the outer ring. For example, in the double row taper-roller bearing for the hub unit for fitting a wheel of an automobile, it has been proposed that the conventional inner ring and outer ring be united into one unit integral with a flanged member formed with a bolt hole, which has hitherto supported the inner ring and the outer ring and fixedly joined to the wheel or the car body.

What is proposed above is, however, unable to control in fact the negative axial gap and can be therefore neither assembled nor used.

FIG. 13 shows a double row taper-roller bearing 1 which has been broadly used so far for supporting the wheel. This double row taper-roller bearing 1 is constructed in such a way that a pair of inner rings 3, 3 are each so supported by a plurality of taper-rollers 4, 4 as to be rotatable on a minor-diameter side of one single outer ring 2. Double row outer ring tracks 5, 5 each taking a configuration of tapered concave surface are formed along an inner peripheral surface of the outer ring 2, and inner ring tracks 6, 6 each assuming a configuration of tapered convex surface are formed along outer peripheral surfaces of the respective inner rings 3, 3. The taper-rollers 4, 4 are sandwiched in between the outer ring tracks 5, 5 and the inner ring tracks 6, 6 in a state the rollers 4, 4 are so held by cages or holders 7, 7 as to be rollable. Further, combined seal rings 8, 8 are attached between an inner peripheral surface at two side ends of the outer ring 2 and outer peripheral surfaces of side ends of the inner rings 3, 3, thereby closing openings at two axial side ends of an air space 9 in which the taper-rollers 4, 4 are set.

The above-described double row taper-roller bearing 1, which has hitherto been widely used, is assembled in procedures shown in FIGS. 14 and 15. To be specific, at first, as shown in FIG. 14, the taper-rollers 4, 4 are arranged along circumferences of the inner rings 3, 3 in the state of being so held by the cages or holders 7, 7 as to be rollable. Then, the inner rings 3, 3 are inserted inside of the outer ring 2 while remaining in this state, and, as shown in FIG. 15, the taper-rollers 4, 4 are brought into contact with the outer ring tracks 5, 5 and the inner ring tracks 6, 6. Then, finally, the combined seal rings 8, 8 are attached between the outer peripheral surfaces of the side ends of the inner rings 3, 3 and the inner peripheral surface at the two side ends of the outer ring 2.

The double row taper-roller bearing 1 itself, which is shown in FIG. 13, has no particular problem. In recent years, however, for the purpose of reducing the number of assembly steps by decreasing the number of parts, a so-called third-generation hub unit structure has been contrived, wherein the double row taper-roller bearing for supporting the wheel is provided integrally with the hub for supporting and fixing the wheel. If this type of third-generation hub unit structure is adopted, a flange for supporting the wheel is provided on an outer peripheral surface of one side end of the hub body, and a first inner ring track taking a configuration of tapered convex surface and serving to configure the taper-roller bearing of the first row, is formed directly along an outer peripheral surface of an intermediate portion. Then, an inner ring, having a second inner ring track taking a configuration of tapered convex surface, for configuring the taper-roller bearing of the second row, is fixedly fitted to an outer portion of s small-diameter stepped portion formed on an outer peripheral surface of the other side end of the hub body.

In the case of this structure, the flange provided on the outer peripheral surface of the hub body becomes an obstacle, and the seal ring on the side of the flange can not be attached afterward. Accordingly, it is required that this seal ring be, before assembling the hub body and the outer ring together, fixedly fitted inside the side end of the outer ring. Then, it is necessary for the taper-rollers constituting the taper-roller bearing of the first row to be inserted into the hub body on the minor-diameter side of the outer ring while being kept in the state of being disposed along the inner peripheral surface of the outer ring. It might be required for smoothing this inserting operation that the taper-rollers do not shift on the minor-diameter side when performing the inserting operation. In the case of the prior art structure shown in FIG. 13, however, this problem does not occur, and therefore no contrivance against this problem is given.

SUMMARY OF THE INVENTION

It is a primary object of the present invention to provide a double row taper-roller bearing and a method of assembling a double row taper-roller bearing, which are, when in an assembly, capable of assembling and being assembled by controlling a negative axial gap after the assembly.

To accomplish the above object, according to a first aspect of the present invention, a double row taper-roller bearing comprising:

an outer ring having first and second track surfaces which are formed along an inner peripheral surface thereof and respectively configure some proportions of tapered shapes opened opposite to each other outwards in the axial direction;

a first inner ring member extending over an entire length of said outer ring in the axial direction and having a first outer track surface formed along an outer periphery thereof and configuring a part of a tapered shape, facing to said first track surface of said outer ring and opened in the same direction, a portion of the first inner ring member facing to said second track surface of the outer ring being formed as a fitting surface a second inner ring member having a second outer track surface formed along an outer periphery thereof, facing to said second track surface of said outer ring and configuring a part of a tapered shape opened in the same direction, the second inner ring member being fixedly fitted on the fitting surface of said first inner ring member;

a first roller row including a plurality of taper-rollers interposed between said first track surface of said outer ring and said first outer track surface of said first inner ring member, and rolling while being kept in contact with said track surfaces, and a first holder for holding said first taper-rollers; and a second roller row including a plurality of taper-rollers interposed between said second track surface of said outer ring and said second outer track surface of said second inner ring member, and rolling while being kept in contact with said track surfaces, and a second holder for holding said second taper-rollers.

According to a second aspect of the present invention, there is provided a method of assembling a double row taper-roller bearing comprising:

an outer ring having first and second track surfaces which are formed along an inner peripheral surface thereof and respectively configure some proportions of tapered shapes opened opposite to each other outwards in the axial direction;

a first inner ring member extending over an entire length of said outer ring in the axial direction and having a first outer track surface formed along an outer periphery thereof and configuring a part of a tapered shape, facing to said first track surface of said outer ring and opened in the same direction, a portion of the first inner ring member facing to said second track surface of said outer ring being formed as a fitting surface;

a second inner ring member having a second outer track surface formed along an outer periphery thereof, facing to said second track surface of said outer ring and configuring a part of a tapered shape opened in the same direction, the second inner ring member being fixedly fitted on the fitting surface of said first inner ring member;

a first roller row including a plurality of taper-rollers interposed between said first track surface of said outer ring and said first outer track surface of said first inner ring member, and rolling while being kept in contact with said track surfaces, and a first holder for holding said first taper-rollers; and a second roller row including a plurality of taper-rollers interposed between said second track surface of said outer ring and said second outer track surface of said second inner ring member, and rolling while being kept in contact with said track surfaces, and a second holder for holding said second taper-rollers, said method comprising, after assembling said outer ring, said first roller row, said first inner ring member and said second roller row, the steps of:

measuring a tentative axial gap, with a tentative bearing body being assembled by inserting, into an air space for inserting said second inner ring member formed between the fitting surface of said first inner ring member and said second roller row, a master for said second inner ring member having the known dimensions serving as a positive axial gap with respect to this air space; and calculating dimensions of said second inner ring member, from which a desired negative axial gap is obtained based on the measured tentative axial gap, and selecting and assembling said desired second inner ring member on the basis of a result of the calculation.

It is another object of the present invention to provide a novel wheel support structure incorporating a double row taper-roller bearing, and an assembling method thereof.

To accomplish this object, according to a third aspect of the present invention, a wheel support structure including a fixed member to be fixed to a knuckle of a suspension system, and a hub for fitting a wheel, said structure comprising:

an outer ring integral with said fixed member and having first and second track surfaces which are formed along an inner peripheral surface thereof and respectively configure some proportions of tapered shapes opened opposite to each other outwards in the axial direction;

a first inner ring member integral with said hub, extending over an entire length of said outer ring in the axial direction and having a first outer track surface formed along an outer periphery thereof and configuring a part of a tapered shape, facing to said first track surface of said outer ring and opened in the same direction, a portion of the first inner ring member facing to said second track surface of said outer ring being formed as a fitting surface a second inner ring member having a second outer track surface formed along an outer periphery thereof facing to said second track surface of said outer ring and configuring a part of a tapered shape opened in the same direction, the second inner ring member being fixedly fitted on the fitting surface of said first inner ring member;

a first roller row including a plurality of taper-rollers interposed between said first track surface of said outer ring and said first outer track surface of said first inner ring member, and rolling while being kept in contact with said track surfaces, and a first holder for holding said first taper-rollers; and a second roller row including a plurality of taper-rollers interposed between said second track surface of said outer ring and said second outer track surface of said second inner ring member, and rolling while being kept in contact with said track surfaces, and a second holder for holding said second taper-rollers.

According to a fourth aspect of the present invention, there is provided a method of assembling a wheel support structure which includes a fixed member to be fixed to a knuckle of a suspension system, and a hub for fitting a wheel, said structure comprising:

an outer ring integral with said fixed member and having first and second track surfaces which are formed along an inner peripheral surface thereof and respectively configure some proportions of tapered shapes opened opposite to each other outwards in the axial direction;

a first inner ring member integral with said hub, extending over an entire length of said outer ring in the axial direction and having a first outer track surface formed along an outer periphery thereof and configuring a part of a tapered shape facing to said first track surface of said outer ring and opened in the same direction, a portion of the first inner ring member facing to said second track surface of said outer ring being formed as a fitting surface a second inner ring member having a second outer track surface formed along an outer periphery thereof facing to said second track surface of said outer ring, and configuring a part of a tapered shape opened in the same direction, the second inner ring member being fixedly fitted on the fitting surface of said first inner ring member;

a first roller row including a plurality of taper-rollers interposed between said first track surface of said outer ring and said first outer track surface of said first inner ring member, and rolling while being kept in contact with said track surfaces, and a first holder for holding said first taper-rollers; and a second roller row including a plurality of taper-rollers interposed between said second track surface of said outer ring and said second outer track surface of said second inner ring member, and rolling while being kept in contact with said track surfaces, and a second holder for holding said second taper-rollers, said method comprising, after assembling said outer ring, said first roller row, said first inner ring member and said second roller row, the steps of:

measuring a tentative axial gap, with a tentative bearing body being assembled by inserting, into an air space for inserting said second inner ring member formed between the cylindrical surface of said first inner ring member and said second roller row, a master for said second inner ring member having the known dimensions serving as a positive axial gap with respect to this air space; and calculating dimensions of said second inner ring member, from which a desired negative axial gap is obtained based on the measured tentative axial gap, and selecting and assembling said desired second inner ring member on the basis of a result of the calculation.

According to a fifth aspect of the present invention, a hub unit for an automobile, comprises a hub body, an inner ring member fixedly fitted on an outer portion of the hub body, an outer ring disposed along circumferences of the hub body and of the inner ring member, a plurality of taper-rollers provided between outer peripheral surfaces of the hub body and of the inner ring, and an inner peripheral surface of the outer ring, a first seal ring for hermetically sealing between an inner peripheral surface of one side end of the outer ring and an outer peripheral surface of an intermediate portion of the hub body, and a second seal ring for hermetically sealing between an inner peripheral surface of the other side end of the outer ring and an outer peripheral surface of a side end of the inner ring member. The hub body includes a flange, provided along an outer peripheral surface of one side end thereof, for supporting a wheel, a first inner ring track taking a configuration of tapered convex surface and directly formed along an outer peripheral surface of an intermediate portion thereof, for configuring the taper-roller bearing of a first row, and a small-diameter stepped portion provided on an outer peripheral surface of the other side end thereof. The inner ring member includes a second inner ring track, taking a configuration of tapered convex surface and formed along an outer peripheral surface thereof, for configuring the taper-roller bearing of a second row, and is fixedly fitted to an outer portion of the small-diameter stepped portion. The outer ring includes first and second outer ring tracks, each taking a configuration of tapered concave surface and formed along an inner peripheral surface thereof, for configuring the taper-roller bearings of the first and second rows. Some of the plurality of taper-rollers are disposed between the first inner ring track and the first outer ring track in a state of so being held by the first holder as to be rollable, and the remaining taper-rollers are disposed between the second inner ring track and the second outer ring track in a state of being sop held by the second holder as to be rollable. The first holder prevents the respective taper-rollers from coming off inwards in the diametrical direction in a state of holding some of the plurality of taper-rollers. The second holder prevents the respective taper-rollers from coming off outwards in the diametrical direction in a state of holding the remaining taper-rollers among the plurality of taper-rollers.

According to a sixth aspect of the present invention, a method of assembling a hub unit for an automobile according to the fifth aspect of the invention, comprises a step of holding some of a plurality of taper-rollers by a first holder and disposing the taper-rollers inside of a first outer ring track along an inner peripheral surface of an outer ring, a step of inserting a hub body inside of the outer ring in a state of fixedly fitting a first seal ring to an inner peripheral surface of one side end of the outer ring till a first inner ring track is positioned inwardly of some of the plurality of taper-rollers, a step of subsequently fitting the inner ring member to an outer portion of a small-diameter stepped portion of the hub body while being inserted inside of the outer ring in a state where the remaining taper-rollers among the plurality of taper-rollers are held along a circumference of a second inner ring track by a second holder, and a step of finally attaching a second seal ring between an outer peripheral surface of an end of the inner ring member and an inner peripheral surface of a side end of the outer ring.

In the thus constructed hub unit for the automobile and assembling method thereof according to the present invention, the novel third-generation hub unit incorporating the double row taper-roller bearing can be assembled at a high efficiency, and the cost for this type of hub unit can be also reduced.

DESCRIPTION OF THE PREFERRED EMBODIMENTS

A first embodiment of the present invention will hereinafter be described with reference to the accompanying drawings.

Figure 1:
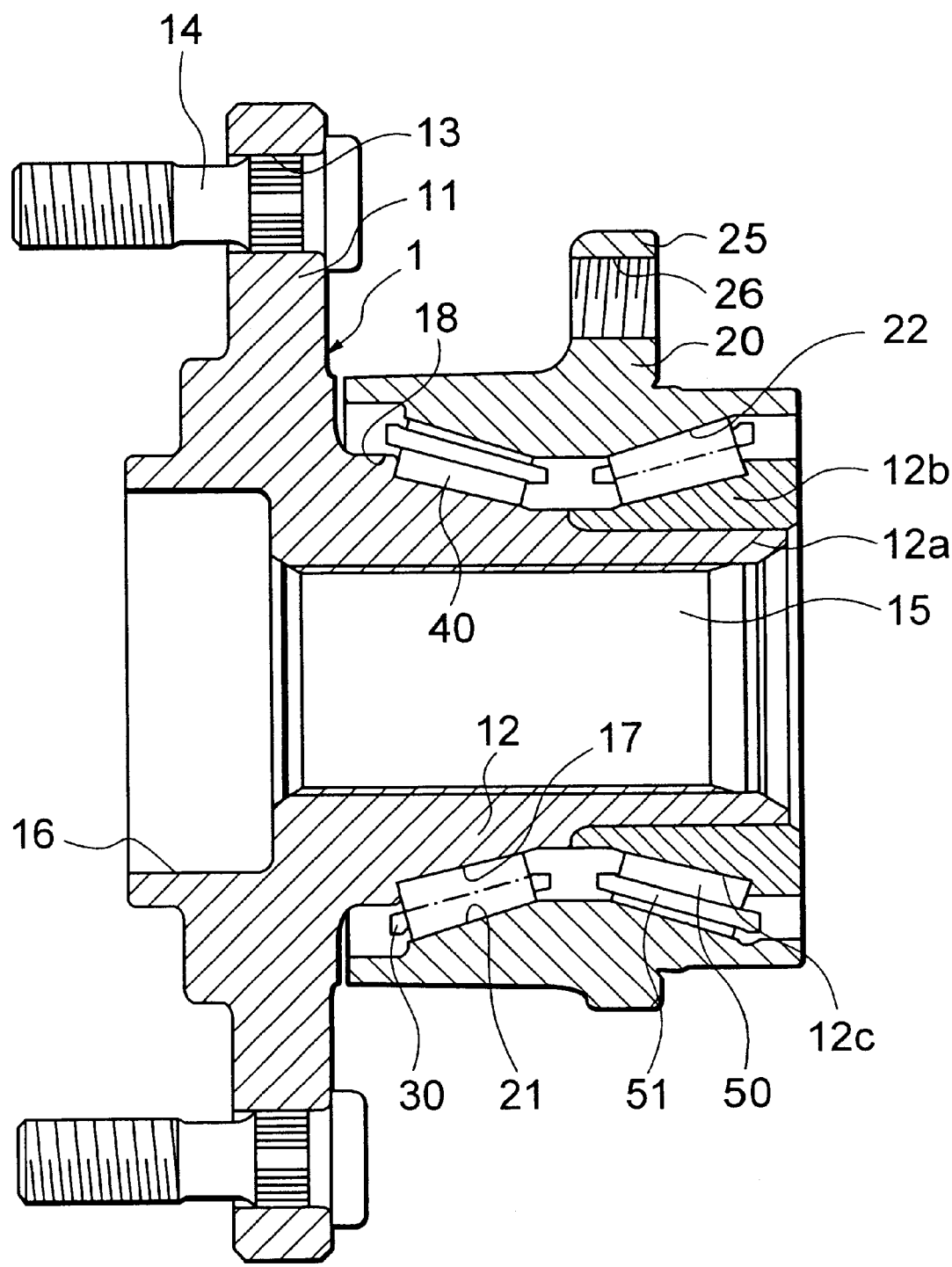
FIG. 1 is an axially central sectional view showing a double row taper-roller bearing for a hub unit for an automobile which is assembled in accordance with a first embodiment of the present invention.

FIG. 1 is an explanatory view showing a method of controlling an axial gap when assembling a taper-roller bearing of a hub unit for fitting a driving front wheel of an automobile by way of the first embodiment of the present invention.

A hub 1 of the hub unit integrally includes, as the integral parts, a flange 11 for fixing a rim (not shown) of the front wheel, and a cylindrical member 12 extending in an axial direction, to be formed with the taper-roller bearing along an outer periphery thereof and to fix along an inner periphery thereof an axle (unillustrated).

The flange 11 is formed with a proper number of bolt holes 13, and the rim of the wheel (not shown) is fixed by bolts 14. The axle is, as described above, inserted into a central hole 15 of the cylindrical member 12 extending in the axial direction, and the hub 11 is fixed to the axle by bolts (unillustrated) in a bolt hole 16 formed in the central portion of the hub 11. The hub and the wheel, i.e., the wheel and the axle integrally rotate.

The cylindrical member 12 serving as a first inner ring member extends in the axial direction, of which an outer periphery is formed with a first track surface 17 configuring a part of a tapered shape opened toward the flange. The cylindrical member 12 has a large collar portion 18 extending from a side end on a large-diameter-side of the first track surface 17.

An outer ring 20 is disposed outside in the radial direction of the cylindrical member 12. The outer ring 20 is formed with a first inside track surface 21 constituting a part of the tapered shape, facing to the first track surface 17 formed along the cylindrical member 12 serving as a first inner ring member. A predetermined number of first taper-rollers 40 held by a first cage or holder 30 are interposed between the first track surface 17 of the first inner ring member defined as the cylindrical member 12 and the first inside track surface 21 of the outer ring 20. The first holder 30 and the first taper-rollers 40 are combined to constitute a first roller row.

The outer ring 20 is formed with a second inside track surface 22 configuring a part of the tapered shape opened opposite to the first inside track surface 21, and spaced at a predetermined axial distance away from the first inside track surface described above.

On the other hand, a first inner ring member constructed of the cylindrical member 12 has a small-diameter cylindrical portion 12a, formed at a portion facing in the axial direction to the second inside track surface 22 of the outer ring 20, of which an outer periphery is formed with a cylindrical surface with a substantially uniform diameter. A second inner ring member 12b is fixedly fitted to this small-diameter cylindrical portion 12a.

An outer periphery of the second inner ring member 12b is formed with a second track surface constituting a part of the tapered shape, facing to the second inside track surface 22 of the outer ring 20. A predetermined number of second taper-rollers 50 held by a second cage or holder 51 are interposed between the second inside track surface 22 of the outer ring 20 and the second track surface 12c of the second inner ring member 12b in such a way that the rollers 50 roll while being kept in contact with these track surfaces. The second taper-rollers 50 and the second holder 51 are combined to constitute a second roller row. The outer ring 20 has a flange 25 substantially at the center of the outer periphery thereof. The flange 25 is formed with a hole 26 through which a bolt (not shown) is inserted to fix the outer ring to a knuckle of a suspension system on the car body side.

Thus, the hub unit is formed with the double row taper-roller bearing.

Next, the method of assembling the double row taper-roller bearing will be explained in connection with FIGS. 2 and 2A–C.

To start with, the first roller row composed of the first taper-rollers 40 held by the first holder 30, is fitted onto the first track surface 17 of the first inner ring member 12, and then the outer ring 20 is fitted to the outer portion thereof.

Figure 2:
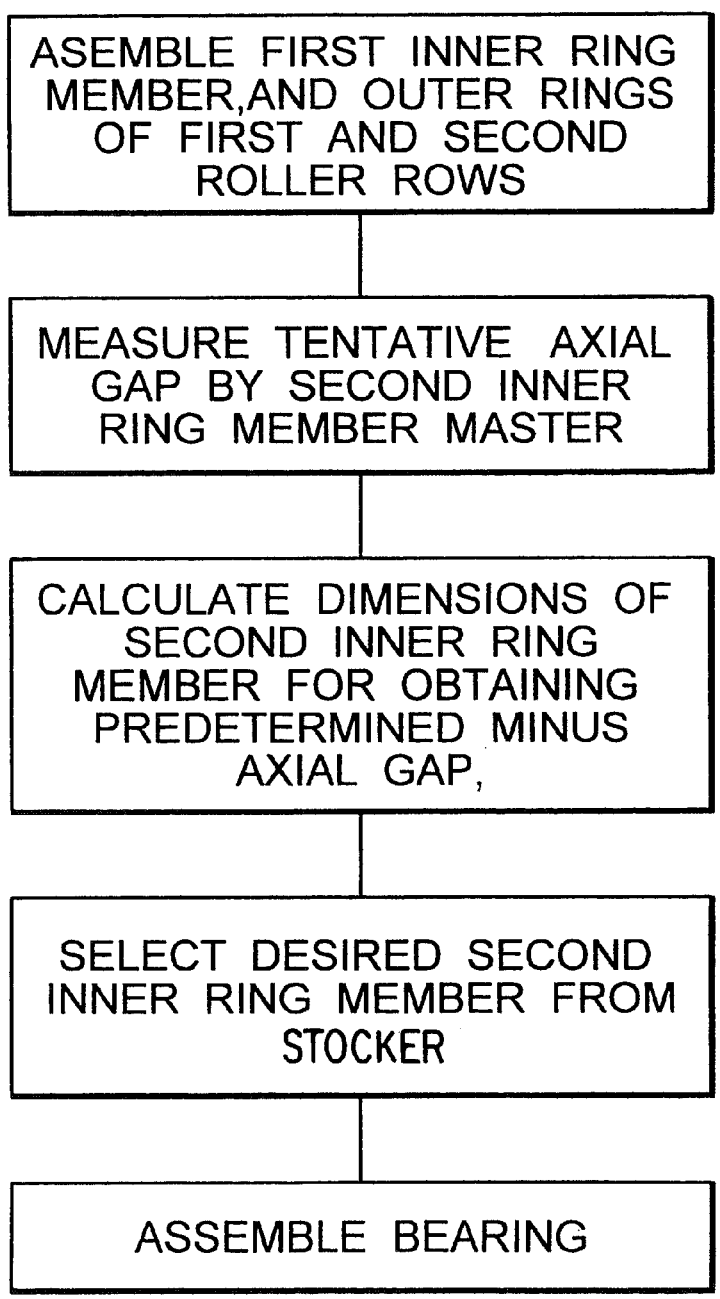
FIG. 2 is an explanatory flowchart showing steps of the assembly in the first embodiment of the present invention.
Figure 2A:
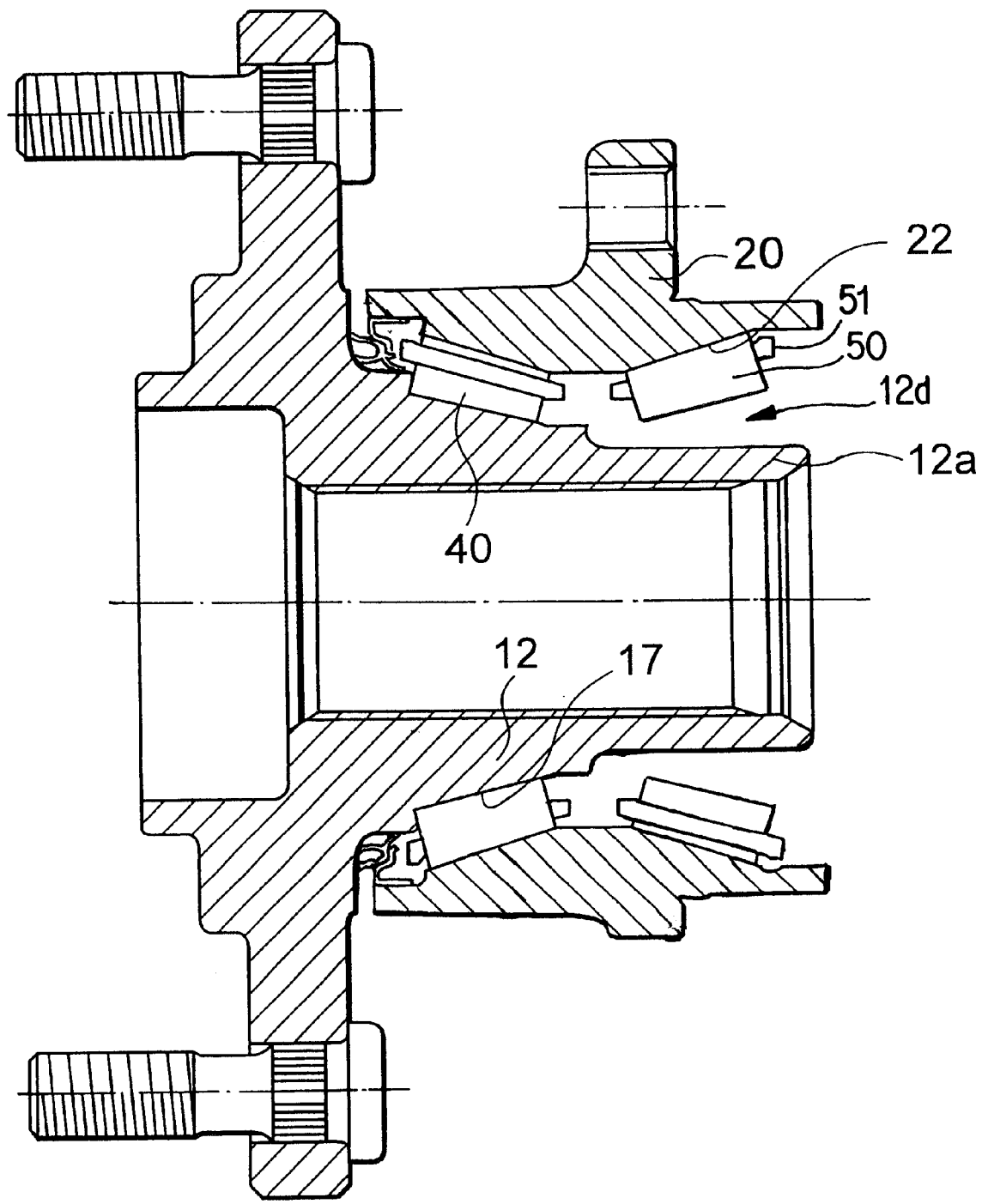
FIG. 2A is an axially central sectional view of a double row taper-roller bearing illustrating the configuration of the bearing in a first process step in assembling the bearing.

Next, the second roller row composed of the second taper-rollers 50 held by the second holder 51 is so fitted as to come into contact with the second inside track surface 22 of the outer ring 20 as shown in FIG. 2A.

Figure 2B:
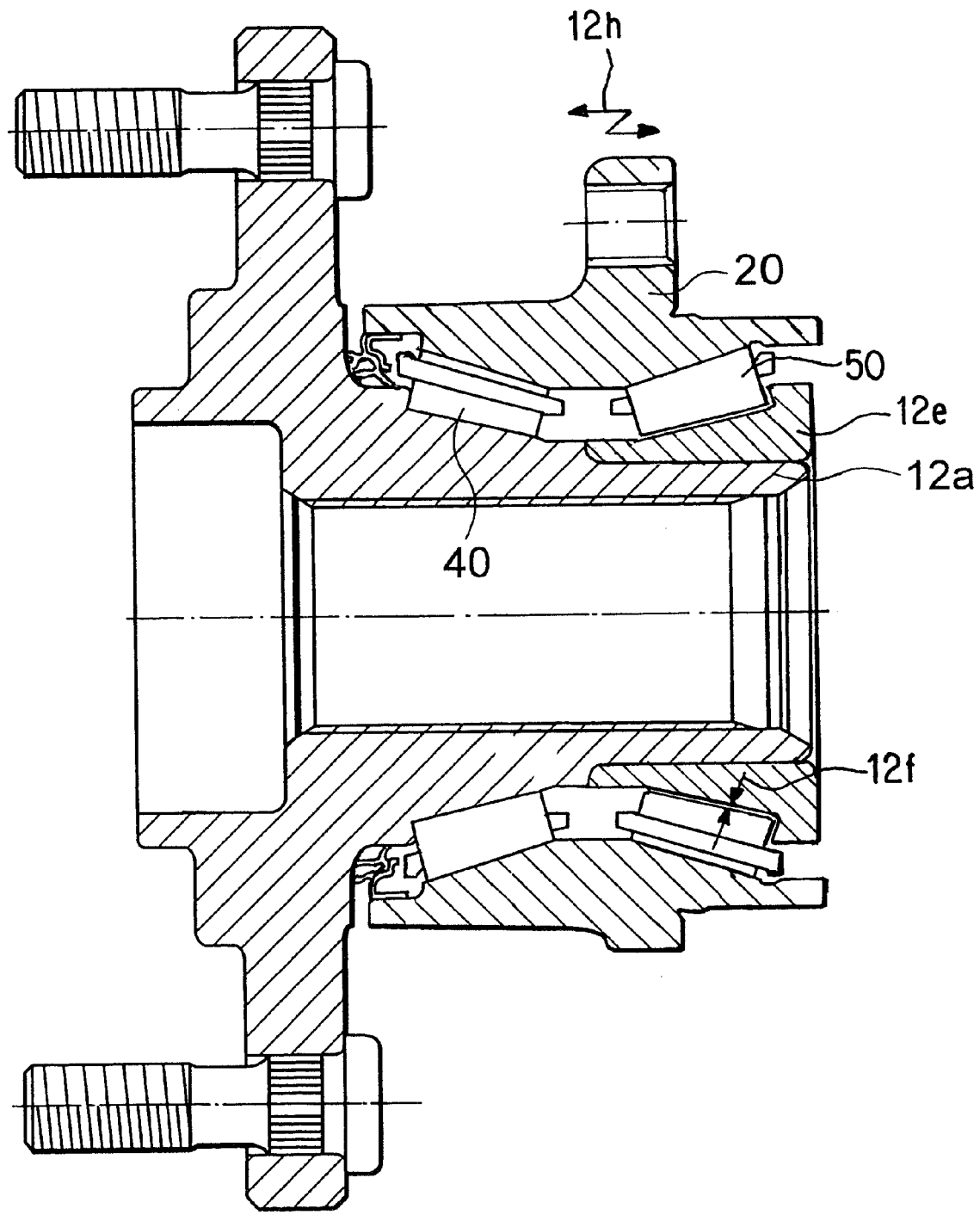
FIG. 2B illustrates the bearing of FIG. 2A in a configuration of the bearing in a second process step in assembling the bearing.

Subsequently, as can be seen in FIG. 2B, a master member 12e of the second inner ring member 12b, which has the known dimensions and a positive axial gap 12f with respect to the assembled taper-roller bearing, is inserted into a space 12d (shown in FIG. 2A) formed between the second roller row and the small-diameter cylindrical portion 12a. The track surface diameter of the master member 12e is small enough to have a positive gap 12f.

Figure 2C:
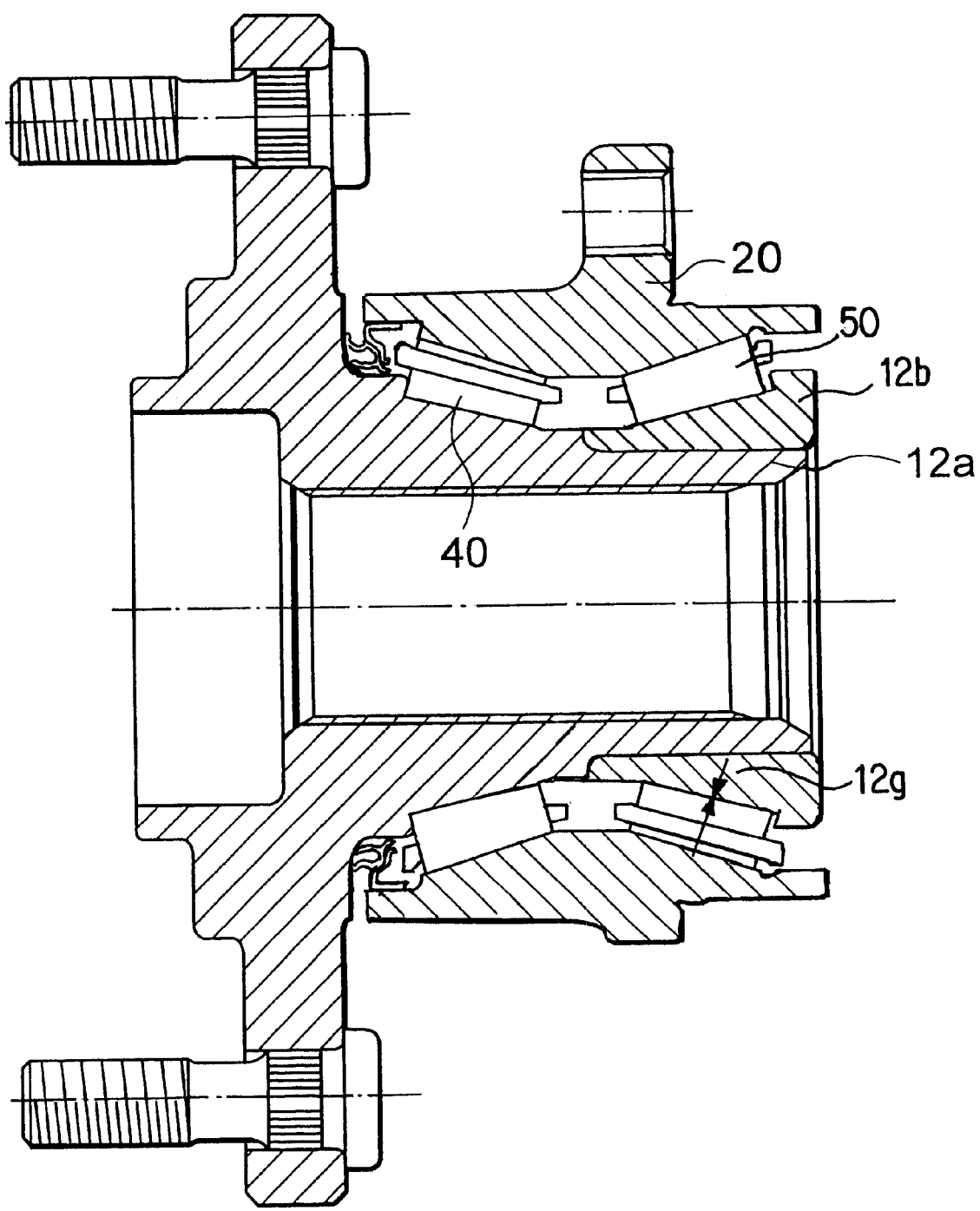
FIG. 2C illustrates the bearing of FIG. 2A in a configuration of the bearing in a third process step in assembling the bearing.

In this state, a tentative axial gap is measured, and, as a next step, dimensions of the second inner ring member 12b for obtaining a negative axial gap 12g (as shown in FIG. 2C) on a desired specification are arithmetically obtained based on a measured result of the tentative axial gap. The tentative axial gap can be measured by moving the outer ring 20 right and left, i.e., in the directions 12h as shown in FIG. 2B, until the outer ring is stopped by loose clearance of each bearing.

A second inner ring member 12b having proper dimensions is chosen out of a stocker of the second inner ring members, corresponding to this arithmetic result, and the second inner ring member 12b selected as a substitute for the master member 12e is incorporated, as shown in FIG. 2C, thereby obtaining the double row taper-roller bearing based on the desired specification.

Note that the second inner ring member 12b may be selected and incorporated either by a manual work or by an automatic operation.

In accordance with the first embodiment, the negative axial gap of the double row taper-roller bearing, which can not be ensured after the assembly, can be controlled by use of the master member before the assembly.

FIGS. 3–8 illustrate a second embodiment of the hub unit for the automobile according to the present invention. the hub unit 10 for the automobile is constructed of a hub body 11, an inner ring member 12 externally fitted to the hub body 11, an outer ring 13 disposed along the peripheries of the hub body 11 and of the inner ring member 12, a plurality of taper-rollers 14a, 14b provided between outer peripheral surfaces of the hub body 11 and of the inner ring member 12 and an inner peripheral surface of the outer ring 13, a first seal ring 15 for hermetically sealing between an inner peripheral surface of one side end of the outer ring 13 and an outer peripheral surface of an intermediate portion of the hub body 11, and a second seal ring 16 for hermetically sealing between an inner peripheral surface of the other side end of the outer ring 13 and an outer peripheral surface of a side end of the inner ring member 12. In the embodiment illustrated, a single seal ring is used as the first seal ring 15, and a combined seal ring is used as the second seal ring 16.

The hub body 11 among those components has a flange 17 for supporting the wheel on an outer peripheral surface of one side end (an outer side end in the widthwise direction in a state of being assembled to the car body, corresponding to a left side end in FIG. 1). Further, a first inner ring track 19, taking a configuration of tapered convex surface, for configuring the taper-roller bearing 18 of the first row, is formed directly on the outer peripheral surface of the intermediate portion of the hub body 11. Furthermore, a small-diameter stepped portion 20 is provided on the outer peripheral surface of the other side end (an inner side end in the widthwise direction in the state of being assembled to the car body, corresponding to a right side end in FIG. 3) of the hub body 11. An outer peripheral surface of the small-diameter stepped portion 20 takes a cylindrical shape concentric with the hub body 11. Further, in the embodiment illustrated, the automobile hub unit 10 for supporting the driving wheel is provided, and hence a spline hole 21 for spline-engaging with a side end of a drive axle is provided in a central portion of the hub body 11.

Further, the inner ring member 12 includes a second inner ring track 23 assuming a configuration of tapered convex surface and formed along the outer peripheral surface, for configuring the taper-roller bearing 22 of the second row, and fixedly fitted to an outer portion of the small-diameter stepped portion 20 of the hub body 11. An inclined direction of the second inner ring track 23 is set opposite to an inclined direction of the first inner ring track 19. Further, a proximal end (a right side end in FIG. 3) of the inner ring member 12 protrude slightly from the other side end surface (a right side end surface in FIG. 3) of the hub body 11 in a state of letting a front side end surface (a left side end surface in FIG. 3) of the inner ring 12 impinge upon a stepped surface 24 of the small-diameter stepped portion 20. In the state of being assembled to the car body, a side end surface of a constant velocity joint or a stepped portion formed at the side end portion of the drive axle, impinge upon the side end surface of the proximal end of the inner ring 12 which thus protrudes from the hub body 11, thereby preventing the inner ring 12 from disengaging from the small-diameter stepped portion 20.

Moreover, the inner peripheral surface of the outer ring 13 is formed with first and second outer ring tracks 25, 26, each taking a configuration of tapered concave surface, for configuring the taper-roller bearings 19, 22 of the first and second rows. Inclined directions of the first and second outer ring tracks 25, 26 are set opposite to each other, corresponding to the first and second inner ring tracks 19, 23. Further, the axially intermediate portion of the outer peripheral surface of the outer ring 13 is provided with an outward-flange-like fitting portion 27 for fixing the outer ring 13 to an unillustrated suspension.

Further, some taper-rollers 14a, 14a (a left half in FIG. 3) among the plurality of taper-rollers 14a, 14b are disposed between the first inner ring track 19 and the first outer ring track 25 in a state of being so held by the first holder as to be rollable.

While on the other hand, the remaining taper-rollers 14b, 14b (a right half in FIG. 1) among the plurality of taper-rollers 14a, 14b are disposed between the second inner ring track 23 and the second outer ring track 26 in a state being so held by the second holder 29 as to be rollable.

Figure 5:
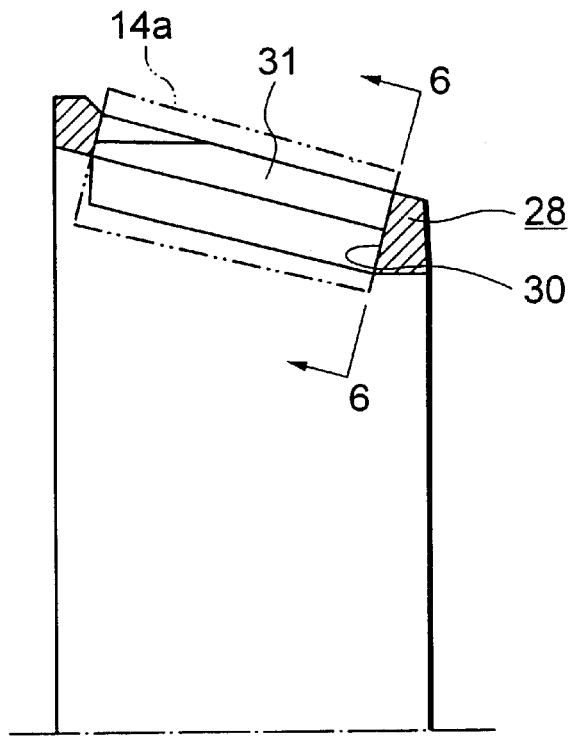
FIG. 5 is a partial sectional view showing a first holder taken out.
Figure 6:
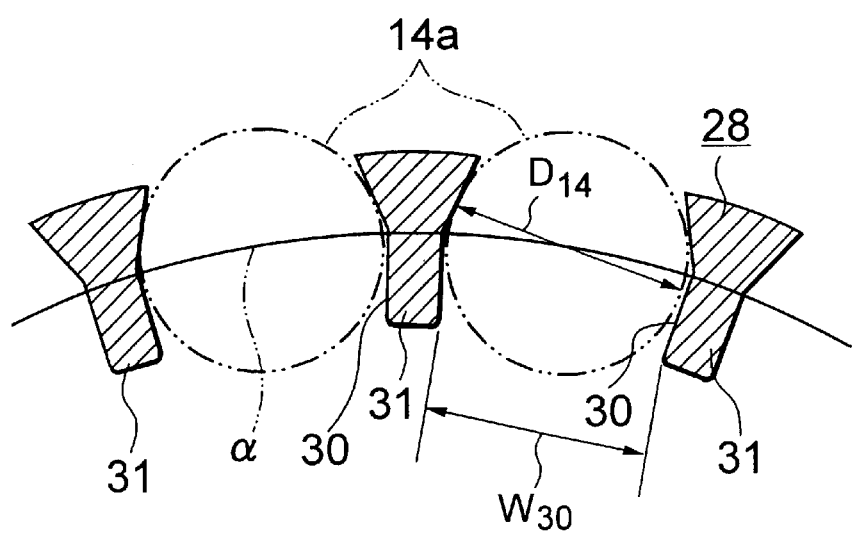
FIG. 6 is a sectional view taken along the line 6—6 in FIG. 5.

Then, the first holder 28, in a state of holding some taper-rollers 14a, 14a among the plurality of taper-rollers 14a, 14b, prevents the respective taper-rollers 14a, 14a from coming off inward in the diametrical direction. Therefore, in the embodiment illustrated, what takes a configuration as shown in FIGS. 5 and 6 is used as the first holder 28. The first holder 28 is formed in a partially tapered cylindrical shape on the whole by injection-molding a synthetic resin exhibiting elasticity, and has pockets 30, 30 and columns 31, 31 which are provided alternately in the circumferential direction. The taper-rollers 14a, 14a are so disposed in the pockets 30, 30 as to be rollable.

Further, an outer peripheral surface of each of the columns 31, 31 is positioned more outwards in the diametrical direction than a pitch circle a of each of the taper-rollers 14a, 14a, and similarly an inner peripheral surface thereof is positioned more inwards than the pitch circle α. Then, widths, extending in the circumferential direction, of two major- and minor-diameter-side openings of the pockets 30, 30 are set well smaller than a diameter of each of the taper-rollers 14a, 14a on the major diameter side, and set slightly smaller than this diameter on the minor diameter side. Accordingly, an operation of setting the taper-rollers 14a, 14a into the pockets 30, 30 is performed while elastically deforming the columns 31, 31 in the circumferential direction from the minor-diameter side of the first holder 28. The columns 31, 31 adjacent to each other in the circumferential direction are, when the pockets accommodate the rollers, elastically deformed in such directions as to get apart from each other in the circumferential direction, and permit the taper-rollers 14a, 14a to pass through.

On the other hand, in the state where the pockets 30, 30 completely accommodate the taper-rollers 14a, 14a, a spacing (corresponding to a circumference-directional width $W_{30}$ of each of the two minor-diameter-side openings of the pockets 30, 30) between the columns 31, 31 adjacent to each other in the circumferential direction, is smaller than a major diameter $D_{14}$ of each of the taper-rollers 14a, 14a. As a result, the first holder 28 prevents the taper-rollers 14a, 14a from unexpectedly coming off inwards in the diametrical direction. Note that the width $W_{30}$ and the major diameter $D_{14}$ gradually change in the axial direction of each of the taper-rollers 14a, 14a, however, the dimensional relationship described above is met in positions aligned with each other.

Figure 7:
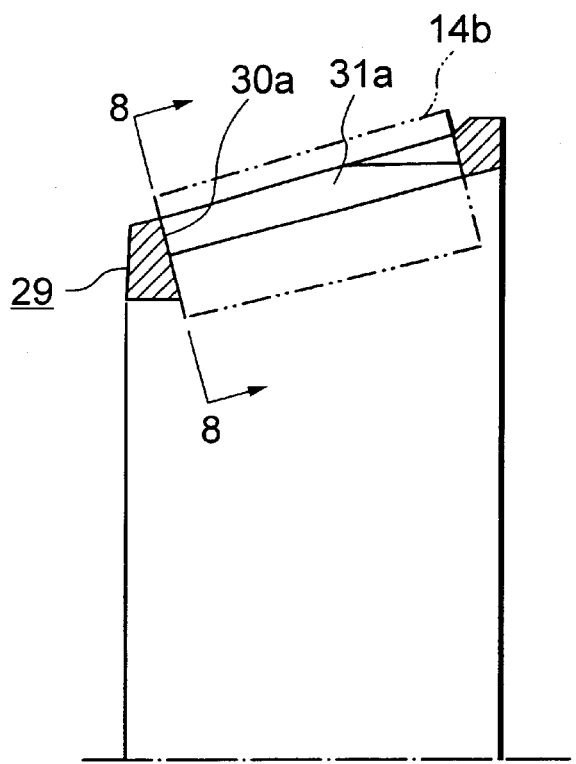
FIG. 7 is a partial sectional view showing a second holder taken out.
Figure 8:
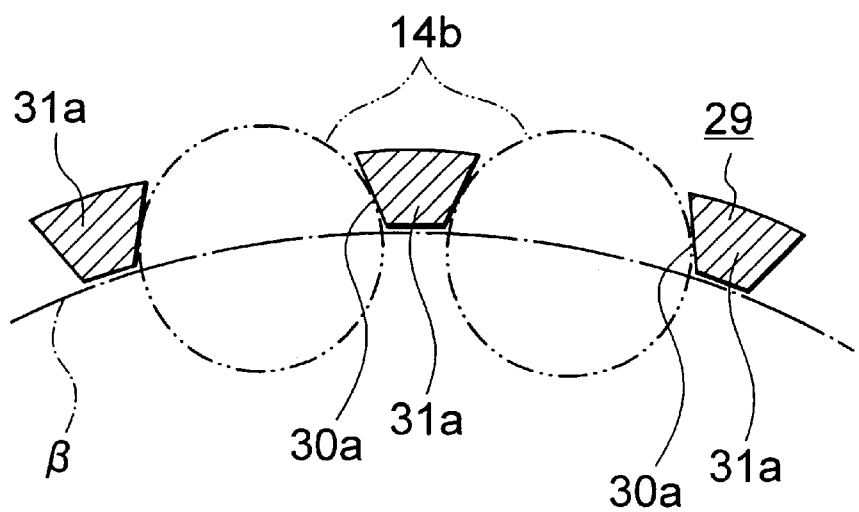
FIG. 8 is a sectional view taken along the line 8—8 in FIG. 7.
Figure 13:
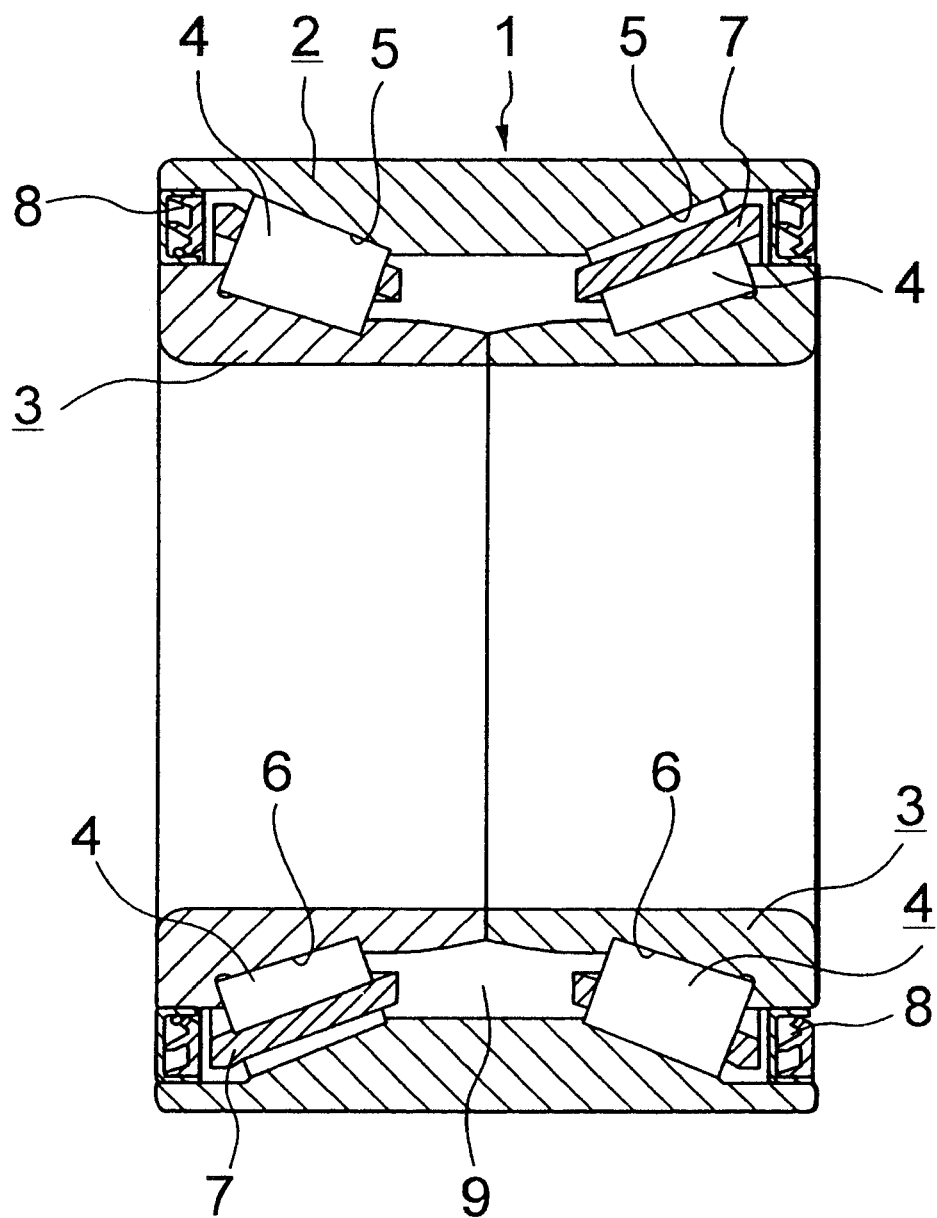
FIG. 13 shows a prior art double row taper-roller bearing for supporting a wheel.
Figure 14:
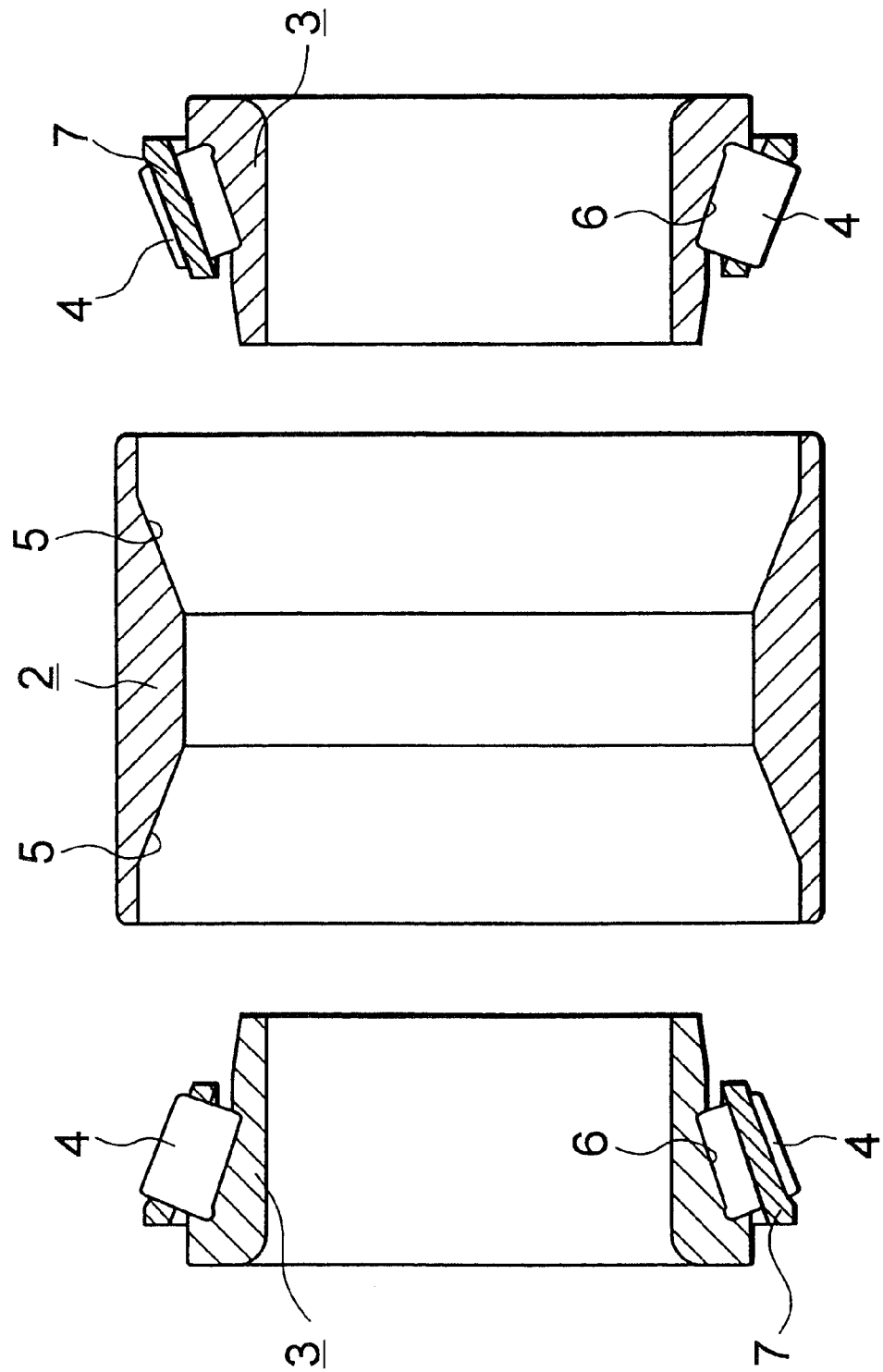
FIG. 14 is a sectional view showing an assembling step.
Figure 15:
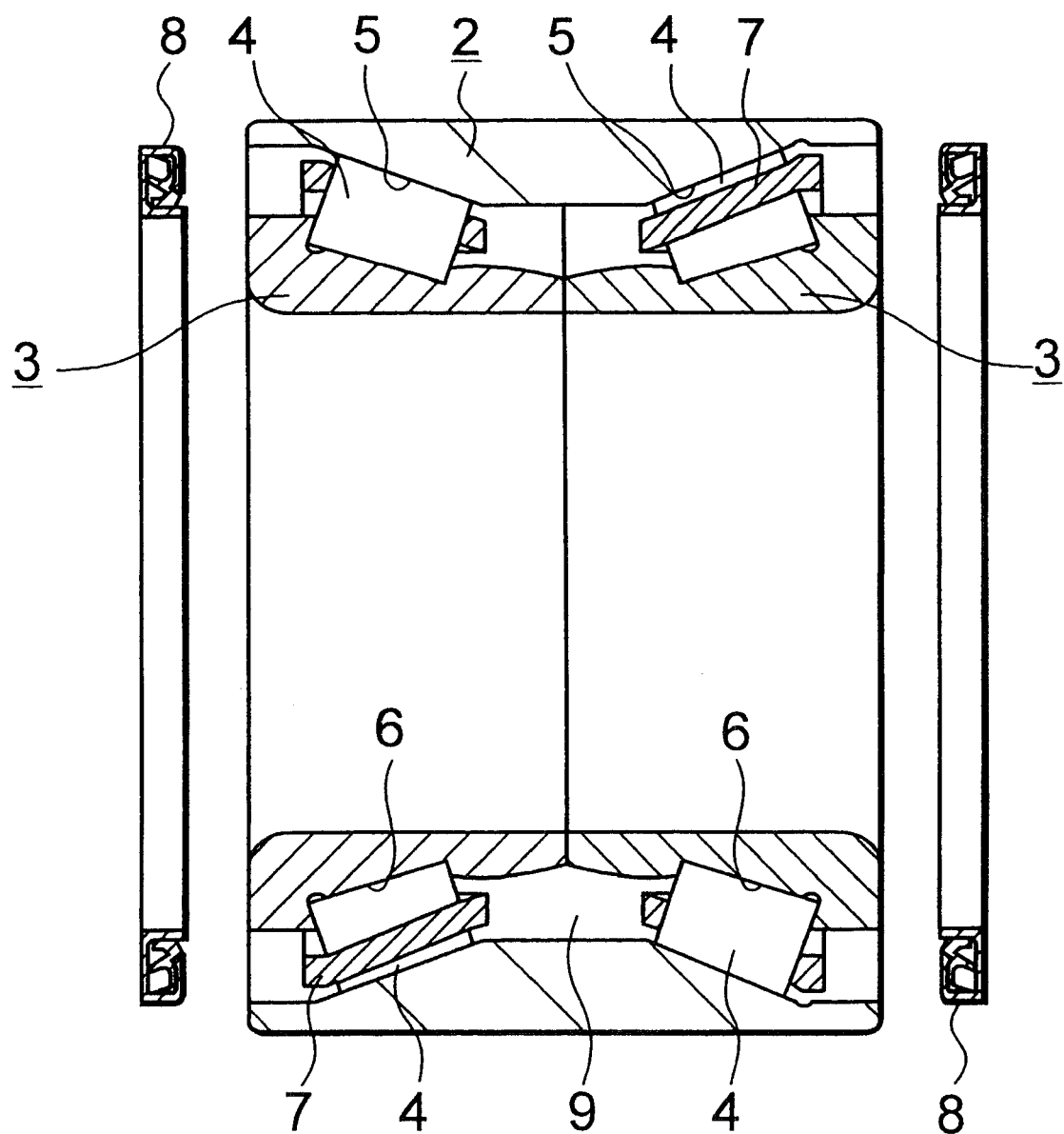
FIG. 15 is a sectional view similarly showing a next step.

On the other hand, the second holder 29 assumes a configuration as shown in FIGS. 7 and 8, and, in the state of holding in a rollable manner the remaining taper-rollers 14b, 14b among the plurality of taper-rollers 14a, 14b, prevents these taper-rollers 14b, 14b from coming off outwards in the diametrical direction. The second holder 29 itself is the same as the holder 7 incorporated into the prior art structure shown in FIGS. 13–15. The second holder 29 is formed in a partially tapered cylindrical shape on the whole by injection-molding a synthetic resin, and has pockets 30a, 30a and columns 31a, 31a which are provided alternately in the circumferential direction. Both of the outer and inner peripheral surfaces of the columns 31a, 31a are positioned more outwards in the diametrical direction than a pitch circle β of each of the taper-rollers 14b, 14b. Then, widths, extending in the circumferential direction, of two major-diameter-side openings of the pockets 30a, 30a are set well smaller than a diameter of each of the taper-rollers 14b, 14b, and set larger than this diameter on the minor diameter side. Accordingly, an operation of setting the taper-rollers 14b, 14b into the pockets 30a, 30a is carried out from the minor-diameter side of the second holder 29. The taper-rollers 14b, 14b are set into the pockets 30a, 30a, and the inner ring 12 is inserted on the minor-diameter side of each of the taper-rollers 14b, 14b, in which state these taper-rollers 14b, 14b are so held in the pockets 30a, 30a that these taper-rollers can not come off.

Figure 9:
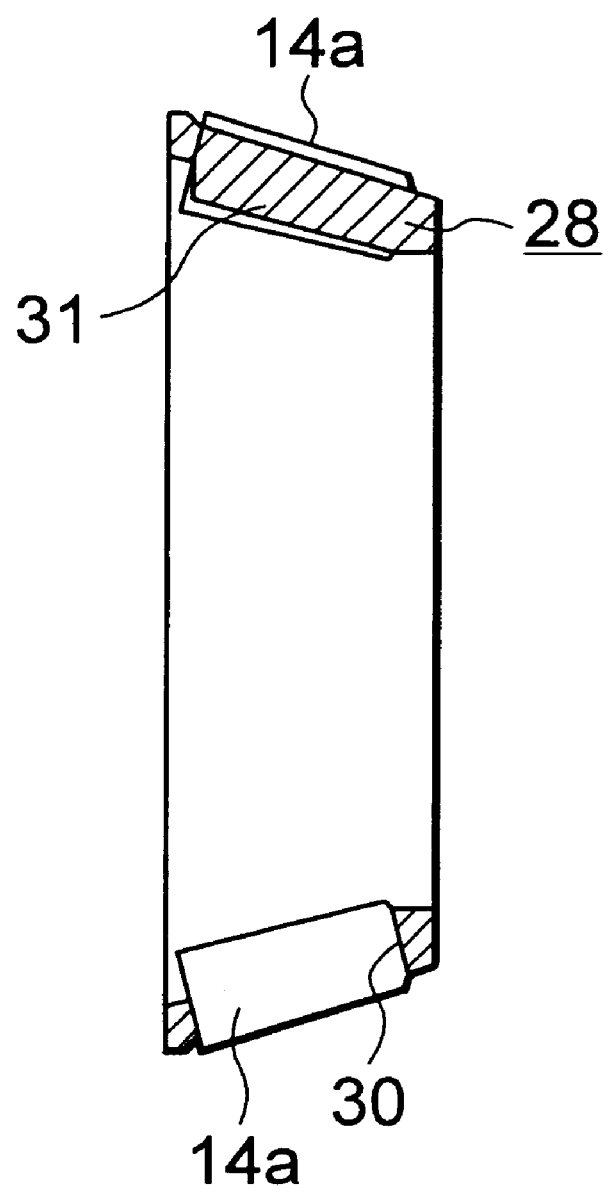
FIG. 9 is a sectional view of a first step in the assembling operation, showing a state where some taper-rollers are held by the first holder.
Figure 10:
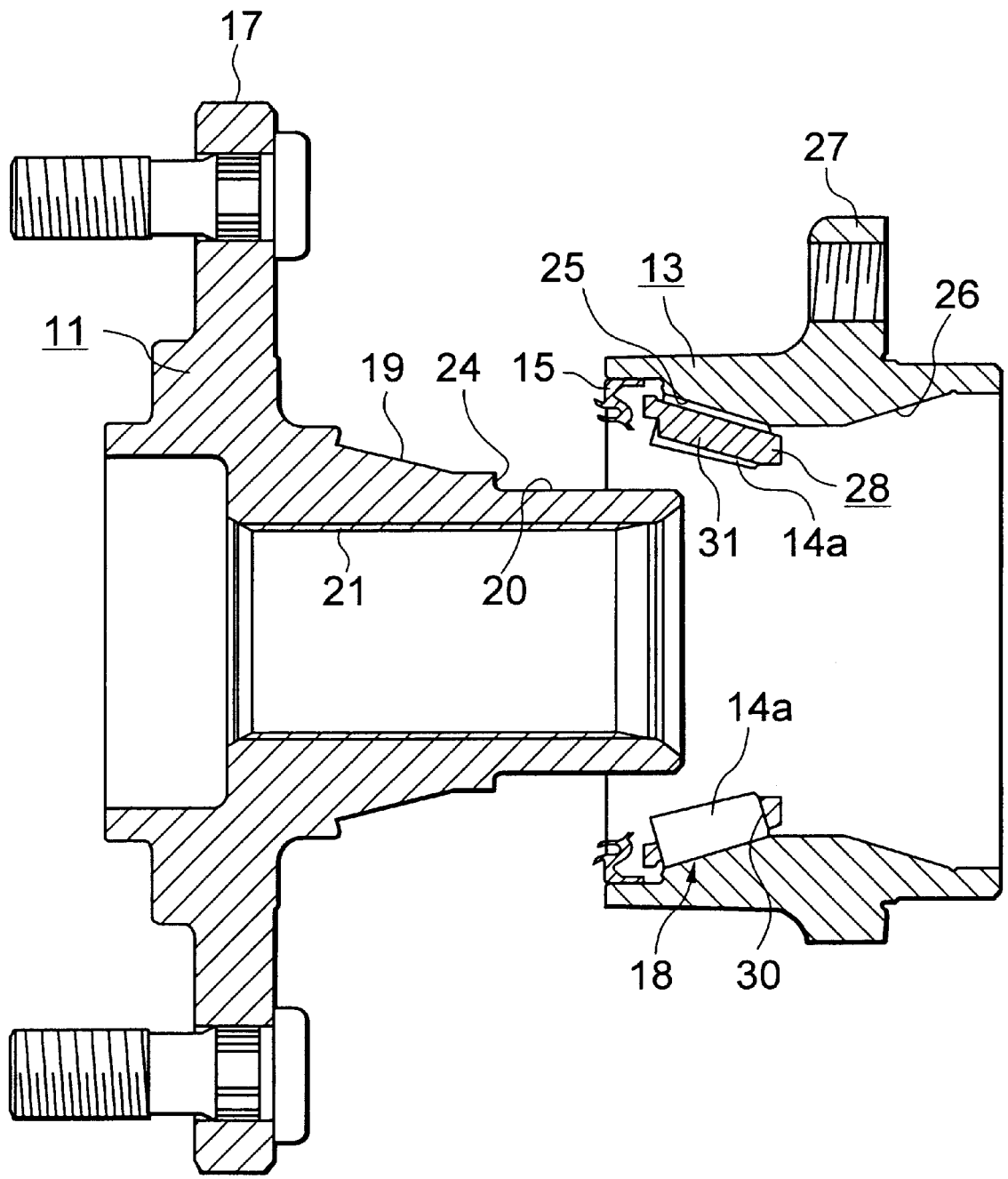
FIG. 10 is a sectional view similarly showing a next step thereof.

Next, the method of assembling the automobile hub unit 10 having the construction described above will be explained with reference to FIGS. 9–12 in addition to FIGS. 3–8. To start with, as illustrated in FIG. 9, some taper-rollers 14a, 14a among the plurality of taper-rollers 14a, 14b are held by the first holder 28. In this state, these taper-rollers 14a, 14a are held by the first holder 28 without being separated. It is therefore feasible to easily carry it in the factory. Then, the taper-rollers 14a, 14a in this state are, as illustrated in FIG. 10, disposed inside the first outer ring track 25 on the inner peripheral surface of the outer ring 13. Further, after some taper-rollers 14a, 14a have been disposed inwardly of the first outer ring track 25, the first seal ring 15 is fixedly fitted to the inner peripheral surface of one side end of the outer ring 13. In this state, the taper-rollers 14a, 14a and the first holder 28 are combined without being separated. Accordingly, it is still possible to facilitate the carrying operation in the factory.

Figure 11:
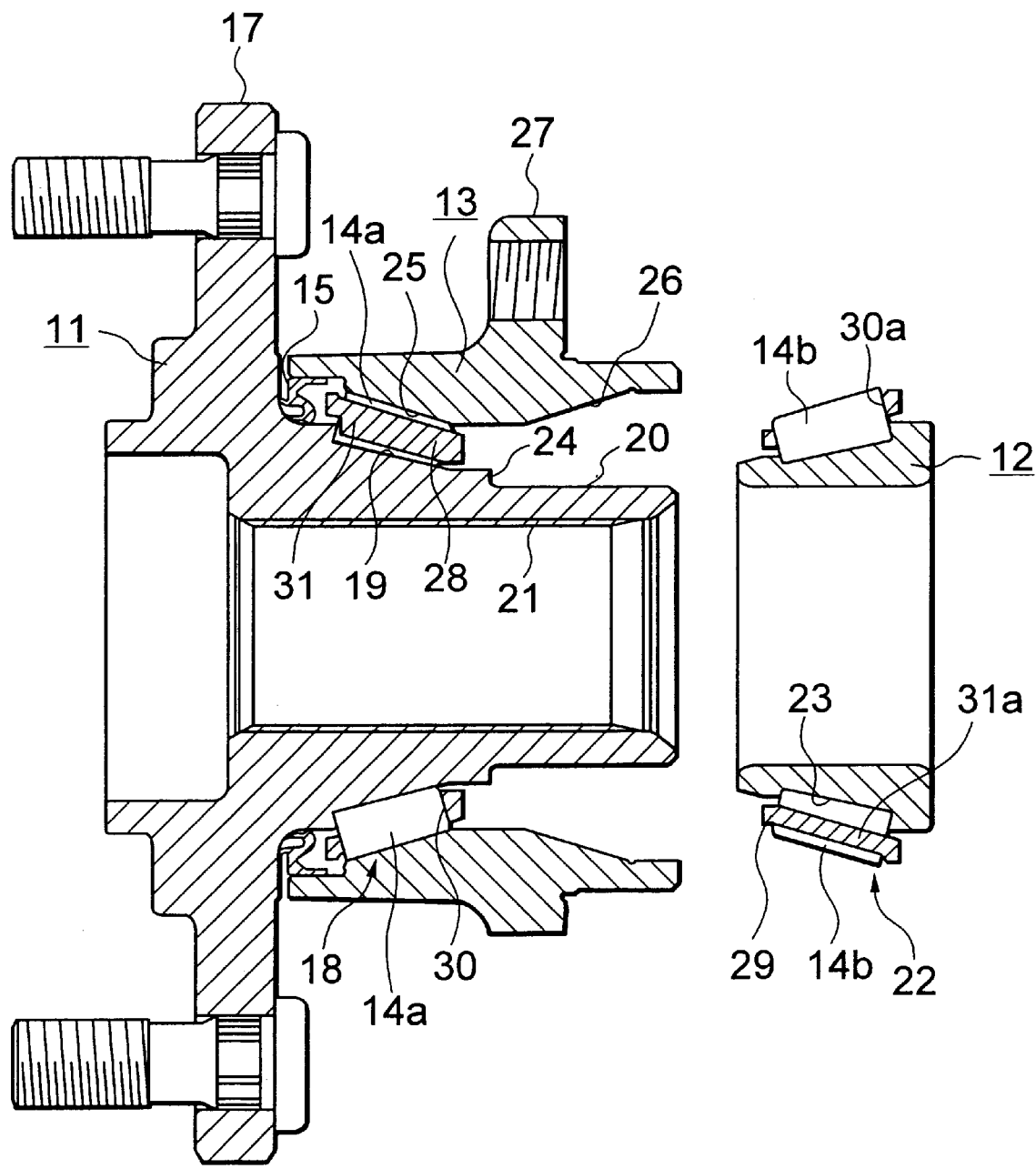
FIG. 11 is a sectional view similarly showing a subsequent step.

Thus, some taper-rollers 14a, 14a are disposed on the inner-diameter side of the outer ring 13, and the first seal ring 15 is fixedly fitted inside, in which state as shown in FIGS. 10 and 11 the hub body 11 is inserted inside the outer ring 13. This inserting operation, as shown in FIG. 11, continues till there is attained a state where the first inner ring track 19 is positioned inwardly of some taper-rollers 14a, 14a among the plurality of taper-rollers 14a, 14b, and the first seal ring 15 comes into contact with an entire periphery of an area, between the flange 17 and the first inner ring track 19, of the surface of the outer ring 13. During this inserting operation, some taper-rollers 14a, 14a held by the first holder 28 remain attached to the first outer ring track 25 without coming off inwards in the diametrical direction of the first holder 28. Accordingly, the inserting operation can be smoothly executed with no necessity especially for such a laborious work as to press the taper-rollers 14a, 14a.

Figure 3:
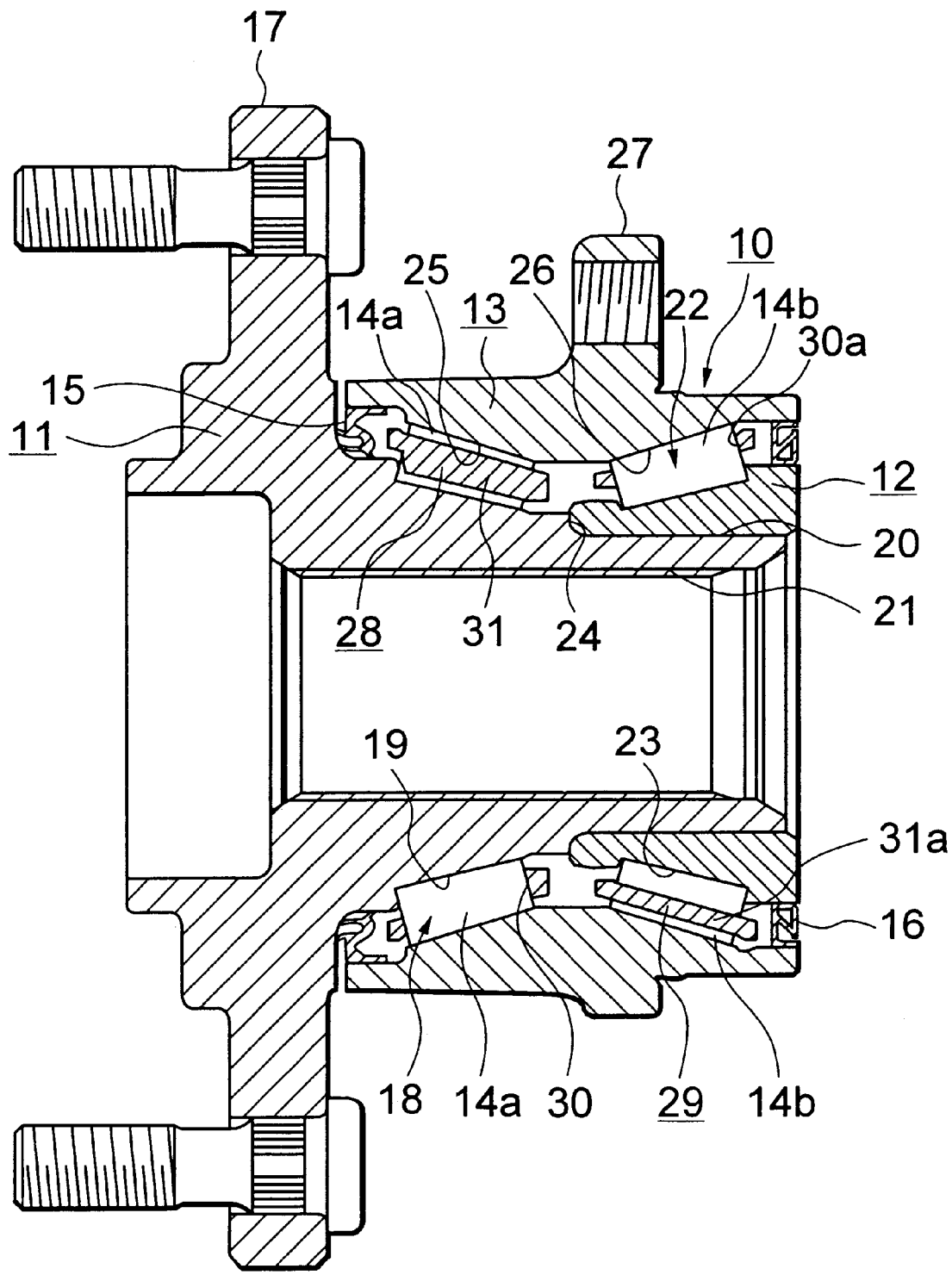
FIG. 3 is a sectional view illustrating a second embodiment of the present invention.
Figure 4:
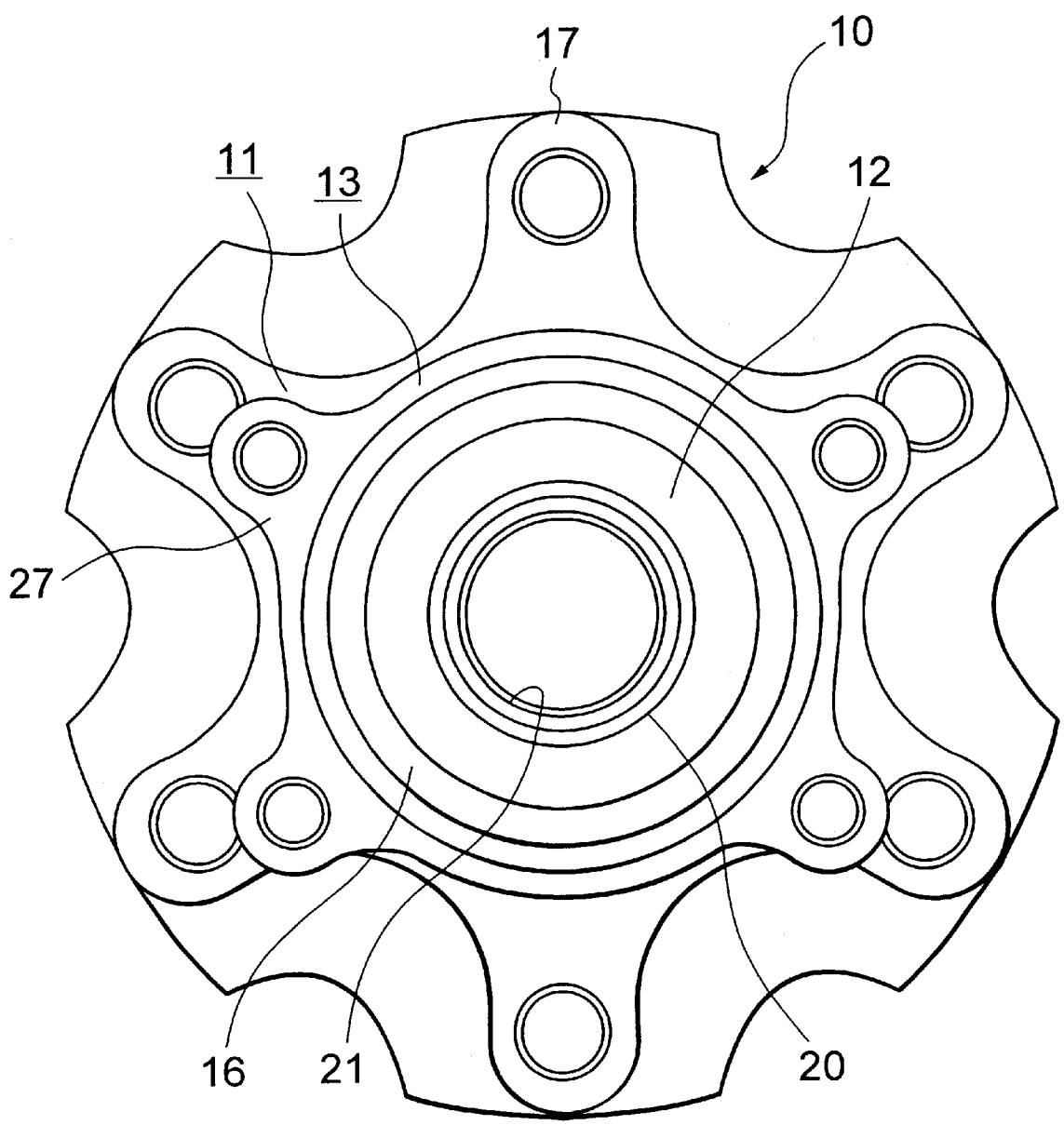
FIG. 4 is a view as viewed from rightward in FIG. 3.
Figure 12:
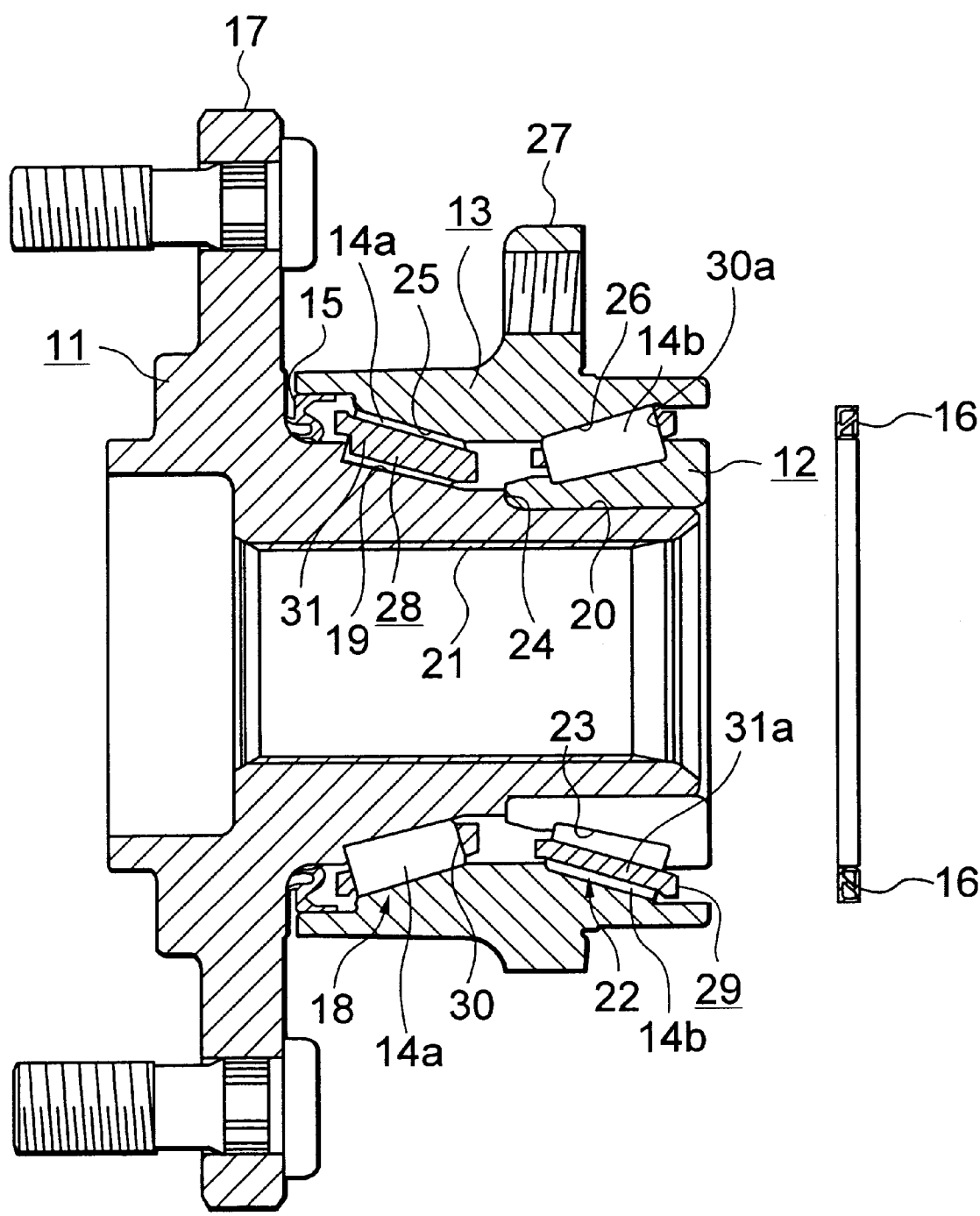
FIG. 12 is a sectional view similarly showing a last step.

Next, as illustrated in FIGS. 11 and 12, the inner ring member 12 is inserted inside the outer ring 13 in a state where the remaining taper-rollers 14b, 14b among the plurality of taper-rollers 14a, 14b are held among the circumference of the second inner ring track 23 by the second holder 29. Then, with this inserting operation, the inner ring-member 12 is fixedly fitted to the outer portion of the small-diameter stepped portion 20 of the hub body 11. Then, finally, as illustrated in FIGS. 12 and 3, the second seal ring 16 is attached between the outer peripheral surface of the side end of the inner ring member 12 and the inner peripheral surface of the side end of the outer ring 13. Note that a pre-load applied to each of the taper-roller bearings 18 of the first and second rows may be arbitrarily readily adjusted by changing a grinding quantity of a part of the inner ring 12.

As discussed above, according to the automobile hub unit and the assembling method thereof in the second embodiment of the present invention, the costs for the automobile hub unit can be reduced by assembling the novel third-generation automobile hub unit at a high efficiency.

What is claimed is:

1. A method of assembling a double row taper-roller bearing comprising:

an outer ring having first and second track surfaces which are formed along an inner peripheral surface thereof and respectively configure some proportions of tapered shapes opened opposite to each other outwards in the axial direction;

a first inner ring member extending over an entire length of said outer ring in the axial direction and having a first outer track surface formed along an outer periphery thereof and configuring a part of a tapered shape, facing to said first track surface of said outer ring and opened in the same direction, a portion of the first inner ring member facing to said second track surface of said outer ring being formed as a fitting surface;

a second inner ring member having a second outer track surface formed along an outer periphery thereof, facing to said second track surface of said outer ring and configuring a part of a tapered shape opened in the same direction, the second inner ring member being fixedly fitted on the fitting surface of said first inner ring member;

a first roller row having a pitch circle diameter and including a plurality of taper-rollers interposed between said first track surface of said outer ring and said first outer track surface of said first inner ring member, and rolling while being kept in contact with said track surfaces, and a first holder for holding said first taper-rollers; and a second roller row having about a same dimension of the pitch circle diameter of said first roller row and including a plurality of taper-rollers interposed between said second track surface of said outer ring and said second outer track surface of said second inner ring member, and rolling while being kept in contact with said track surfaces, and a second holder for holding said second taper-rollers, said method comprising, after assembling said outer ring, said first roller row, said first inner ring member and said second roller row, the steps of:

measuring a tentative axial gap, with a tentative bearing body being assembled by inserting, into an air space for inserting said second inner ring member formed between the fitting surface of said first inner ring member and said second roller row, a master for said second inner ring member having the known dimensions serving as a positive axial gap with respect to this air space; and calculating dimensions of said second inner ring member, from which a desired negative axial gap is obtained based on the measured tentative axial gap, and selecting and assembling said desired second inner ring member on the basis of a result of the calculation.

2. A method of assembling a wheel support structure which includes a fixed member to be fixed to a knuckle of a suspension system, and a hub for fitting a wheel, said structure comprising:

an outer ring integral with said fixed member and having first and second track surfaces which are formed along an inner peripheral surface thereof and respectively configure some proportions of tapered shapes opened opposite to each other outwards in the axial direction;

a first inner ring member integral with said hub, extending over an entire length of said outer ring in the axial direction and having a first outer track surface formed along an outer periphery thereof and configuring a part of a tapered shape facing to said first track surface of said outer ring and opened in the same direction, a portion of the first inner ring member facing to said second track surface of said outer ring being formed as a fitting surface;

a second inner ring member having a second outer track surface formed along an outer periphery thereof facing to said second track surface of said outer ring, and configuring a part of a tapered shape opened in the same direction, the second inner ring member being fixedly fitted on the fitting surface of said first inner ring member;

a first roller row having a pitch circle diameter and including a plurality of taper-rollers interposed between said first track surface of said outer ring and said first outer track surface of said first inner ring member, and rolling while being kept in contact with said track surfaces, and a first holder for holding said first taper-rollers; and a second roller row having about a same dimension of the pitch circle diameter of said first roller row and including a plurality of taper-rollers interposed between said second track surface of said outer ring and said second outer track surface of said second inner ring member, and rolling while being kept in contact with said track surfaces, and a second holder for holding said second taper-rollers, said method comprising, after assembling said outer ring, said first roller row, said first inner ring member and said second roller row, the steps of:

measuring a tentative axial gap, with a tentative bearing body being assembled by inserting, into an air space for inserting said second inner ring member formed between the fitting surface of said first inner ring member and said second roller row, a master for said second inner ring member having the known dimensions serving as a positive axial gap with respect to this air space; and calculating dimensions of said second inner ring member, from which a desired negative axial gap is obtained based on the measured tentative axial gap, and selecting and assembling said desired second inner ring member on the basis of a result of the calculation.

* * * * *